United States Patent [19]

Sekine et al.

[11] Patent Number: 4,752,797
[45] Date of Patent: Jun. 21, 1988

[54] PHOTOGRAPHIC CAMERA

[75] Inventors: Jiro Sekine; Hiroshi Komatsuzaki; Hiroshi Hara; Nobuyuki Kameyama, all of Tokyo, Japan

[73] Assignee: Fuji Photo Film Co., Ltd., Japan

[21] Appl. No.: 333,936

[22] Filed: Dec. 23, 1981

[30] Foreign Application Priority Data

Dec. 26, 1980 [JP] Japan .................. 55-186574

[51] Int. Cl.⁴ .................. G03B 1/00; G03B 17/02
[52] U.S. Cl. .................. 354/212; 354/288
[58] Field of Search .............. 354/211, 288, 203, 212; 242/71.4, 71.5

[56] References Cited

U.S. PATENT DOCUMENTS

| | | | |
|---|---|---|---|
| 3,479,938 | 11/1969 | Winkler et al. | 354/212 |
| 4,324,476 | 4/1982 | Seely | 354/288 |
| 4,332,453 | 6/1982 | Seely et al. | 354/288 |
| 4,339,193 | 7/1982 | Harvey | 354/288 |

FOREIGN PATENT DOCUMENTS 143549  11/1980  Japan .................. 354/211

Primary Examiner—Michael L. Gellner
Attorney, Agent, or Firm—Pasquale A. Razzano

[57] ABSTRACT

A camera adapted to be loaded with a 35 mm film cassette having a cylindrical body and a tongue portion for defining a film exit slit through which the leader of the film projects, the tongue portion extending substantially tangentially from the side wall of the body. The camera has an openable backlid member and a film chamber member defining a cassette receiving chamber. The cassette receiving chamber is adapted to be opened when the backlid member is opened and comprises a cylindrical portion and a slot portion which substantially conform with the cylindrical body and the tongue portion in shape. Thus the cassette receiving chamber determines the position and orientation of the film cassette when it is inserted thereinto and holds it in place. A guide member extends from the film chamber member to define between the inner surface of the backlid member and itself a film guiding slit aligned with said slot and extending beyond the film aperture of the camera body. The guide member has an inclined surface inclining downward toward the backlid member. When the cassette is inserted into the cassette receiving chamber, the lower edge of the leader abuts against the inclined surface to be stretched and smoothly introduced into the film guiding slit.

12 Claims, 5 Drawing Sheets

PHOTOGRAPHIC CAMERA

BACKGROUND OF THE INVENTION

1. Field of the Invention

This invention relates to a photographic camera, and more particularly to a 35 mm camera for use with a 35 mm film cassette having a cylindrical cassette body.

2. Description of the Prior Art

The 35 mm film cassettes most widely used at present generally comprise a hollow cylindrical cassette body having an integral tongue portion extending tangentially from the side surface thereof. A film spool is mounted for free rotation along the longitudinal axis of the cassette body and the film is wound therearound. An exit slit is formed in the tongue portion and the film leader is projected outside the body through the exit slit.

When loading a conventional camera with such a film cassette, the backlid of the camera is first opened widely and the cassette is inserted into the film chamber with its upper and lower ends correctly positioned therein so that the film spool engages with the rewind cam projecting into the chamber. Then the film is drawn out from the cassette body across the film aperture and the tip of the film leader is inserted into a slit in the film take-up spool while the perforations of the film are brought into engagement with the transport sprockets. Thereafter, the film wind-up lever and the shutter release button are carefully operated to correctly wind the film around the take-up spool. When it is confirmed that the film is correctly wound, then the backlid is closed. This conventional film loading operation is rather troublesome and requires a certain amount of skill. Accordingly the film loading operation is rather difficult especially for the aged, women or children.

There have been proposed various types of cameras improved to make the film loading operation easier. However, even in these improved cameras, the film loading operation cannot be accomplished by simply inserting the film cassette into the film chamber. In other words, other operations are still required in addition to insertion of the film cassette. For example, in a certain type of improved camera it is necessary to draw out the film from the cassette body and to position the film leader near a film take-up chamber. In another type the film must be pressed down until the backlid is closed to keep it from curling up as is its natural tendency. In still another type having a specially designed film take-up chamber, it is necessary to insert the film leader into a slit formed in the film take-up chamber.

There also have been known 110 cartridges and 126 cartridges having a film feeding chamber and a film take-up chamber formed integrally. These cartridges can be easily loaded into a 110 camera or a 126 camera. However 110 cameras and 126 cameras are not in wide use. Further, the 35 mm film cassette and the 110 or 126 cartridge differ from each other in their systems. Therefore, the concept of the 110 or 126 cartridge cannot be applied to the 35 mm cassette.

SUMMARY OF THE INVENTION

In view of the foregoing description and observations, the primary object of the present invention is to provide a 35 mm which permits easy-loading of a 35 mm film cassette of the conventional type and which can be economically manufactured.

Another object of the present invention is to provide a 35 mm camera which can be easily loaded with a conventional 35 mm film cassette by simple insertion of the cassette, without need to touch or manipulate the film leader thereof.

The photographic camera in accordance with the present invention has a film chamber member defining a cassette receiving chamber, and an openable backlid member. The film chamber member may be disposed either on the camera body or on the backlid member. The cassette receiving chamber is adapted to be exposed when the backlid member is opened and comprises a cylindrical portion and a slot portion which substantially conform with the cylindrical body and the tongue portion in shape. Thus the cassette receiving chamber determines the position of the film cassette wheh it is inserted thereinto and holds the film cassette in place. A guide member extends from the film chamber member to define between the inner surface of the backlid member and itself a film guiding slit aligned with said slot and extending beyond the film aperture of the camera body. The guide member has an inclined surface inclining downward toward the backlid receiving chamber, the lower edge of the leader abuts against the inclined surface to be stretched and smoothly introduced into the film guiding slit.

DESCRIPTION OF THE PREFERRED EMBODIMENTS

Figure 1:
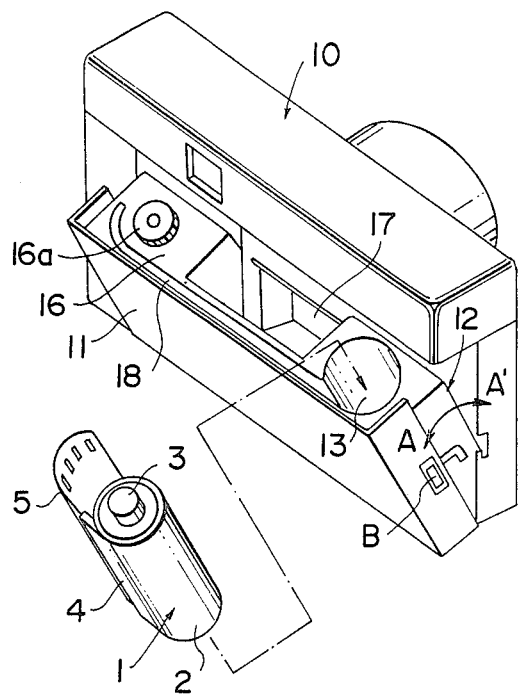
FIG. 1 is a perspective view of a photographic camera in accordance with an embodiment of the present invention.

In FIG. 1, there is shown a 35 mm camera in accordance with an embodiments of the present invention together with a 35 mm film cassette 1 to be loaded in the camera.

As is well known and as shown in FIG. 1, the cassette 1 comprises a hollow cylindrical body 2, a film spool 3 mounted in the body 2 along the longitudinal axis thereof and an integrally formed tongue portion 4 extending generally tangentially from the side wall of the body 2. An exit slit (not shown) is formed in the tongue portion 4 and a leader 5 of a 35 mm film wound on the spool 3 in the body 2 projects through the exit slit by a predetermined length determined by the maker of the cassette.

The camera of this embodiment includes a camera body 10 having a backlid member 11 hinged to the rear side of the body 10 at its lower edge so as to swing open and shut in the direction shown by arrows A and A'. It should be noted that the present invention concerns the film loading system and accordingly parts such as a shutter release button, a film wind-up lever and a rewind lever are not shown in the drawings. A film chamber member 12 defining a film chamber 13 for receiving the cassette 1 is mounted on the backlid member 11 so that the film chamber 13 is entirely opened to permit insertion and extraction of the cassette when the backlid member 11 is opened as shown in FIG. 1. The backlid member 11 is normally locked in the closed position by, for example, a latch which can be released by depressing a button B.

Figure 2:
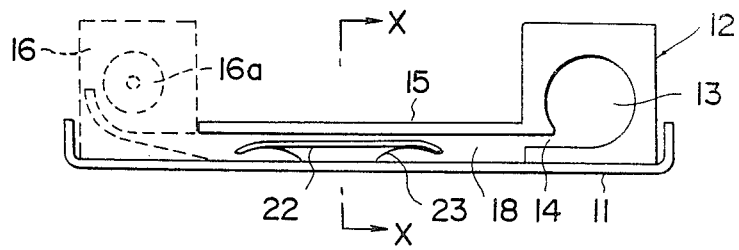
FIG. 2 is a schematic plan view of a film chamber member, a guide member and a backlid member of the camera of FIG. 1.
Figure 3A:
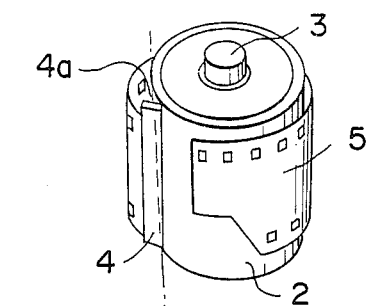
FIG. 3A is a frequency perspective view of the film chamber member and the guide member.
Figure 3B:
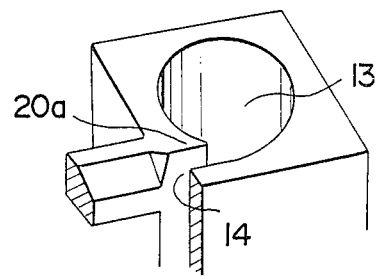
FIG. 3B is a view similar to FIG. 3A showing a minor modification of the film chamber member.
Figure 3B:
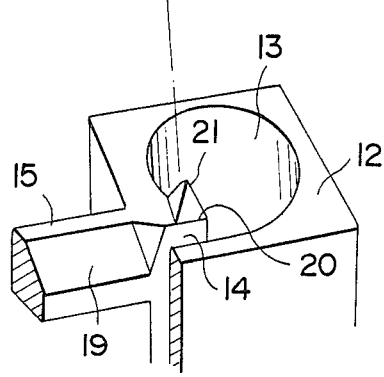

Now referring to also FIGS. 2 and 3A, the film chamber 13 opens through a slot 14 formed in the film chamber member 12 near a corner thereof adjacent to the backlid member 11. A guide member 15 extends from the film chamber member 12 toward a film take-up chamber member 16 mounted on the backlid member 11 spaced from the film chamber member 12. The film take-up chamber member 16 defines a chamber in which a film wind-up mechanism such as a wind-up spool 16a is mounted. The film chamber member 12 and the film take-up chamber member 16 are located on the backlid member 11 so that the members 12 and 16 are positioned on opposite sides of a film aperture 17 when the backlid member 11 is closed. The guide member 15 extends horizontally from the upper end of the film chamber member 12 on the side of the slot 14 remote from the backlid member 11 and in parallel to the inner surface of the backlid member to define a film guiding slit 18 between itself and the backlid member. Preferably, the slit 18 extends to reach the film take-up chamber member 16 so as to be able to guide a long leader. The film chamber 13 is substantially cylindrical in shape and dimensioned to receive and hold the cassette body 2 in place. The slot 14 extends tangentially of the film chamber 13 to receive the tongue portion 4 of the cassette 1 when the body 2 of the cassette 1 is inserted into the film chamber 13. The guide member 15 has a longitudinally extending inclined surface 19 which inclines downward toward the inner surface of the backlid member 11. The inclined surface 19 facilitates smooth introduction of the leader 5 into the film guiding slit 18 when the cassette body 2 and the tongue portion 4 are received in the film chamber 13 and the slot 14, respectively. Alternatively, the guide member 15 may be in the form of a round rod. The diameter of the cylindrical portion of the film chamber 13 is determined so that the cassette 1 cannot be inserted into the film chamber 13 unless the tongue portion 4 thereof is received in the slot 14. Therefore, the cassette 1 cannot be inserted into the film chamber 13 in incorrect or inverted orientation. A peninsular portion (inner edge portion) 20 of the slot 14 which is to engage with a recess 4a defined between the rear face of the tongue portion 4 and the peripheral surface of the cassette body 2 when the cassette 1 is inserted into the film chamber 13 may be flat as indicated at 20a in FIG. 3B, but preferably is provided with a tapered projection 21 (FIG. 3A) in order to facilitate insertion of the cassette 1 as described in more detail hereinbelow.

Figure 4A:
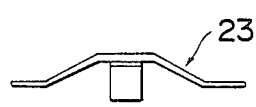
FIG. 4A is a plan view of a plate spring assembly for mounting a film pressure plate on the backlid member in the embodiment of FIG. 1.
Figure 5:
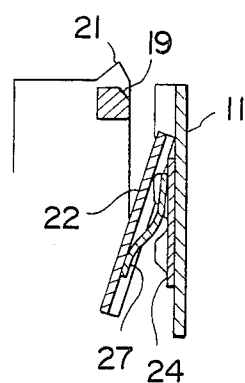
FIG. 5 is a fragmentary sectional view of the plate line X—X of FIG. 2.
Figure 4B:
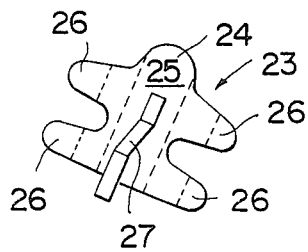
FIG. 4B is a front elevational view of the plate spring assembly.

A film pressure plate 22 (FIG. 2) is mounted on the inner surface of the backlid member 11 by way of a plate spring assembly 23. The plate spring assembly 23 comprises a main spring plate 24 having an intermediate portion 25 and four supporting faces 26, and a cranked resilient strip member 27 fixed to the intermediate portion 25 at one end thereof as shown in FIGS. 4A and 4B. The intermediate portion 25 of the main spring plate 24 is generally flat, and the supporting faces 26 are all flat and lie in a plane spaced from and parallel to the plane of the intermediate portion 25. The cranked resilient strip member 27 extends beyond the plane in which the supporting faces 26 lie and the other end of the strip member 27 is fixed to the lower portion of the film pressure plate 22. The film pressure plate 22 is supported in a inclined position with the upper portion thereof being against the upper two of the supporting faces 26 as shown in FIG. 5 when a force imparted to the resilient strip member is removed upon opening of the backlid member 11 as will be described hereinbelow.

Figure 6:
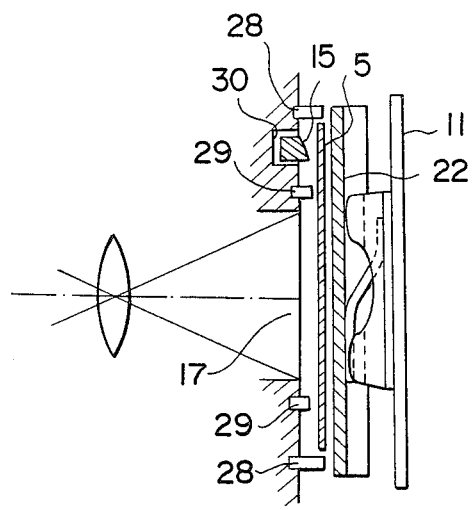
FIG. 6 is a fragmentary cross-sectional view of the camera of FIG. 1 when a film cassette is loaded and the backlid member is closed.

As shown in FIG. 6, on the rear surface of the camera body 10 are provided a pair of guide rails 28 in a well known manner, one above the film aperture 17 and the other below the film aperture 17. A pair of film supporting rails 29 are also provided on the rear surface of the camera body 10, one between the upper guide rail 28 and the film aperture 17 and the other between the lower guide rail 28 and the film aperture 17. An elongate groove 30 which is adapted to receive said guide member 15 is formed between the upper guide rail 28 and the upper film supporting rail 29.

When loading the camera of this embodiment with the 35 mm cassette 1, the backlid member 11 is opened as shown in FIG. 1. Then the cassette body 2 is inserted into the film chamber 13 in a position in which the tongue portion 4 is received in the slot 14 and the recess 4a behind the tongue portion 4 is engaged with the peninsular portion (the inner edge portion) 20 of the slot 14. When the cassette body 2 is inverted or in an incorrect orientation, the tongue portion 4 abuts against the wall portion of the film chamber 13 to prevent insertion of the cassette body 2 into the chamber 13. Therefore, even those who are not familiar with cameras can easily figure out the proper orientation of the cassette body 2. As the cassette body 2 is moved downward into the film chamber 13, the tapered projection 21 on the inner edge portion 20 is received in a space between the leader 5 projecting from the exit slit in the tongue portion 4 and the peripheral surface of the body 2 and abuts against the inner surface, i.e., the photosensitive surface of the leader 5 to move the leader 5 away from the peripheral surface of the cassette body 2 when the leader 5 curls about the cassette body 2 as shown in FIG. 3A. The lower edge of the leader 5 then abuts against the upper surface of the guide member 15 as the cassette body 2 is moved downward, and is introduced into the slit 18 between the guide member 15 and the inner surface of the backlid member 11 with the leader 5 being progressively stretched by the inclined surface 19 of the guide member 15. At this time the pressure plate 22 is inclined to enlarge the clearance between the upper end thereof and the guide member 15 since the backlid member is opened and the cranked resilient strip member 27 of the plate spring assembly 23 has been released. Accordingly the leader 5 is smoothly introduced into the space between the guide member 15 and the pressure plate 22 to be subsequently pressed by the pressure plate 22 when the backlid member 11 is closed.

When the cassette body 2 is completely inserted into the film chamber 13, the backlid member 11 is closed. When the backlid member 11 is closed, the guide member 15 is received in the groove 30 and the pressure plate 22 abuts against the guide rails 28. During the closure of the backlid member 11, the lower portion of the pressure plate 22 first abuts the lower guide rail 28 and the cranked resilient strip member 27 is progressively depressed toward the backlid member 11. When the backlid member 11 is completely closed, the upper portion of the pressure plate 22 abuts against the upper guide rail 28 and the pressure plate 22 is positioned in parallel to the focal plane, with the four supporting faces 26 being pressed against its rear surface and with the leader 5 being sandwiched between it and the film supporting rails 29.

In order to feed the leader 5 to the film take-up chamber and to bring the leader into film wind-up engagement with the film wind-up mechanism, various well known means such as a sprocket or pinch rollers can be used. If desired, a motor driving system may be employed.

As described above, in the camera of the present invention a film cassette can be easily loaded in the camera by simply inserting the cassette body into the film chamber with the cassette body in the correct orientation so that the tongue portion thereof can be inserted into the slot communicating with the film chamber. And it is not necessary for the person loading the camera with film to manipulate the leader of the film.

Figure 7:
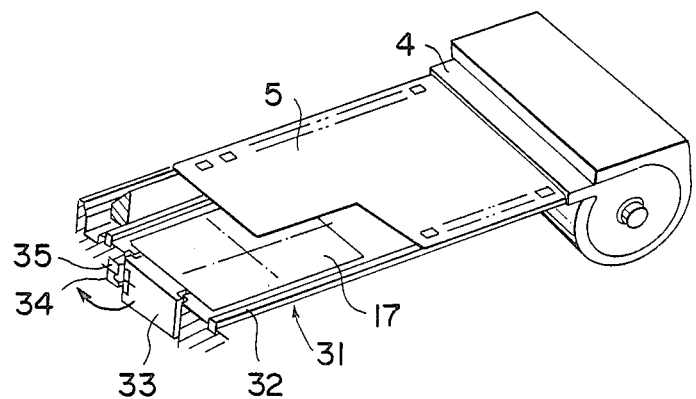
FIG. 7 is a perspective view showing the subject portion of another embodiment of the present invention.

The length of the leader projecting outside the cassette body varies depending on the maker of the cassette. When the leader is long enough to extend beyond the edge of the film aperture remote from the film chamber when the cassette is loaded in the camera, there will be no problem. However if the leader is not long enough and the leading end of the leader is positioned between the film chamber and the edge of the film aperture remote therefrom, there is a possibility that the tip of the leader will become engaged with the edge of the film aperture thereby preventing the leader from being advanced beyond the edge. This problem can be resolved by making the member defining the edge of the film aperture swingable as shown in FIG. 7. In FIG. 7, the film aperture 17 is defined by a frame 31 comprising a fixed portion 32 and a swingable portion 33. The swingable portion 33 defines a part of the edge of the film aperture 17 remote from the film chamber 13 and is supported by a hinge member 34. Further, the swingable portion 33 is urged towards its normal position by means of a spring 35 the force of which is weaker than the film advancing force. In case that the leading end of the leader engages the swingable portion 33 defining the edge of the film aperture 17 remote from the film chamber 13, the swingable portion 33 is pushed away from the film advancing path whereby the film leader 5 can be advanced beyond the edge. The swingable portion 33 of the frame 31 may form the entire length of the edge in question. Further, the swingable portion 33 may be hinged at its lower edge so as to be swung in a plane perpendicular to the film advancing path.

Figure 8:
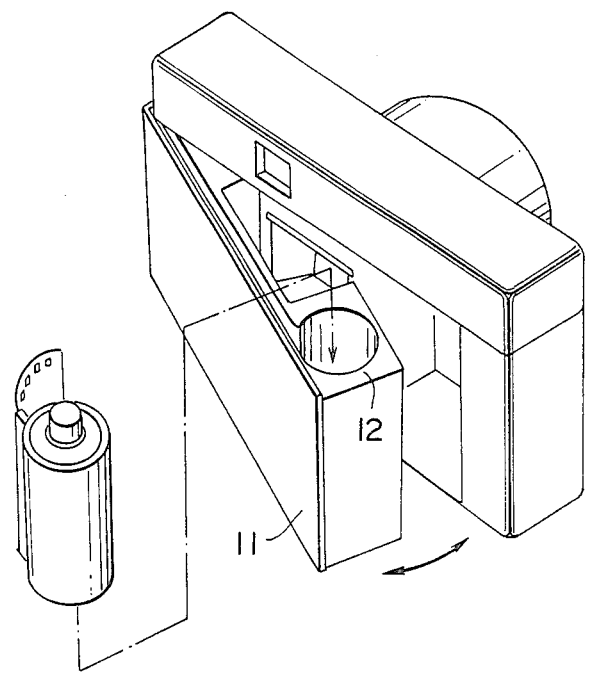
FIGS. 8 and 9 are perspective views showing other embodiments of the present invention.
Figure 9:
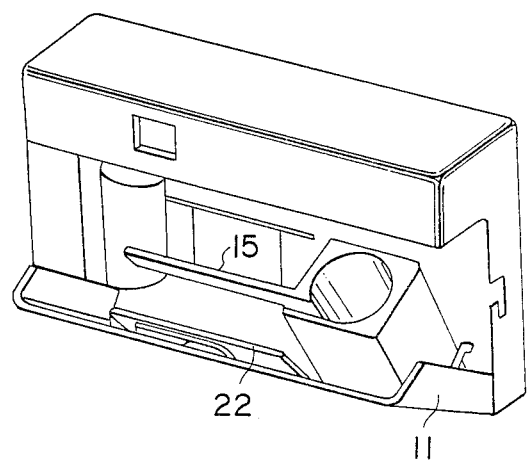

In the above embodiment, the pressure plate 22 is mounted by way of the plate spring assembly 23 so that the pressure plate 22 is inclined with respect to the backlid member 11 when the backlid member 11 is opened. However, the pressure plate 22 may be fixedly mounted on the backlid member 11 in parallel thereto. Further, the film take-up chamber member 16 may be mounted on the camera body 10 instead of on the backlid member 11. In the above embodiment, the backlid member 11 is hinged to the camera body at its lower end. However, it may be hinged to one of the side edges of the camera body as shown in FIG. 8. In this case, the film chamber member 12 is preferably located adjacent to the side edge remote from the hinged edge. Further, instead of fixedly mounting the film chamber member 12 on the backlid member 11, the former member may be pivoted on the latter member so that the latter member can be further swung relative to the former member when opened, thereby enlarging the clearance between the guide member 15 and the inner surface of the backlid member 11 or the pressure plate 22.

Figure 10:
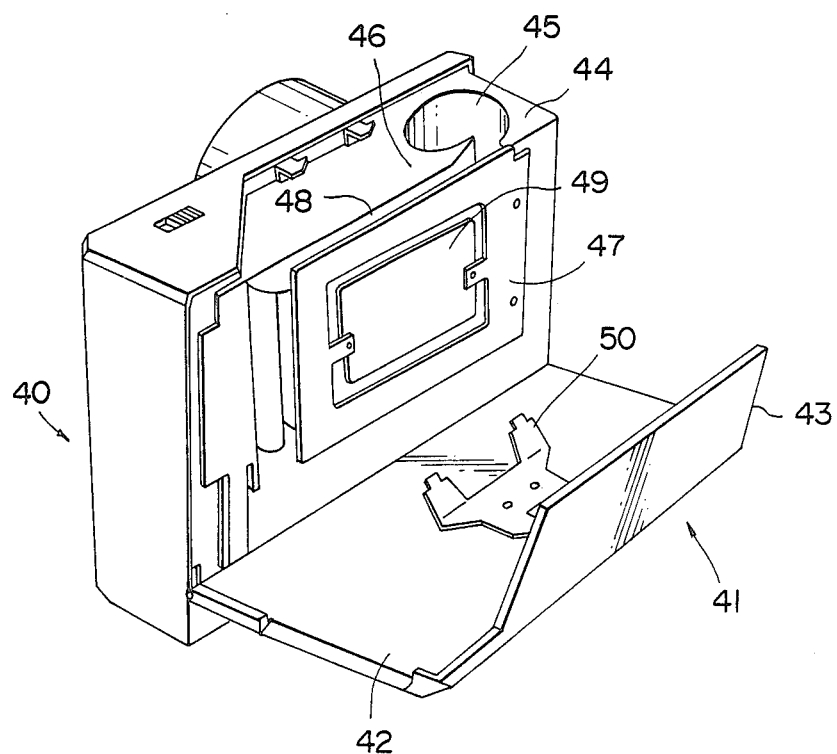
FIG. 10 is a perspective view of a photographic camera in accordance with another embodiment of the present invention with the camera being upside down.

Further, in the above embodiments, the film chamber member is mounted on the backlid member. However, the film chamber member may be mounted on the camera body as shown in FIG. 10. In this embodiment, an L-shaped backlid member 41 comprises a first portion 42 and a second portion 43 integrally extending from the first portion 42 substantially perpendicularly thereto. The backlid member 41 is hinged to a camera body 40 at its upper end and is swingable about a rotational axis adjacent to the upper (lower as seen in FIG. 10) face of the camera body 40 to open and close. When the backlid member 41 is closed, the first and second portions 42 and 43 cover the back-side and the underside of the camera body 40, respectively. A film chamber member 44 similar to the film chamber member 11 of the embodiment shown in FIG. 1 is disposed in the camera body 40 so that a film chamber 45 formed therein entirely opens from the underside of the camera body 40 when the backlid member 41 is opened. A guide member 46 similar to the guide member 15 of the embodiment shown in FIG. 3A extends from the film chamber member 44. The function and the structure of the film chamber member 44 and the guide member 46 are substantially the same as those of the previous embodiments, and accordingly, these members are not shown in detail in FIG. 10.

A pressure plate supporting member 47 is mounted opposed to the guide member 46 to define therebetween a film guiding slit 48. The pressure plate supporting member 47 has a central opening behind a film aperture (not shown) of the camera body 40 and a film pressure plate 49 is supported in the central opening for a slight movement back and forth. A plate spring 50 is mounted on the inner surface of the backlid member 41. When the backlid member 41 is closed, the film pressure plate 49 is pushed forward by the plate spring 50 to support the film. When loading the camera of this embodiment, the camera body 40 is positioned upside down and the backlid member 41 is opened to expose the film chamber 45. Then the cassette 1 is inserted into the film chamber 45 in a manner similar to that described with respect to FIGS. 1 to 9.

We claim:

1. A photographic camera adapted to be loaded with a film cassette having a cylindrical body portion and a tongue portion extending from the peripheral surface thereof in a generally tangential direction, the leader of the film contained in the cassette body projecting through an exit slit formed in the tongue portion, which camera comprises a camera body having an openable backlid member; a film chamber for receiving the film cassette and a film take up mechanism for winding up the film from the cassette body, the film chamber and the film take up mechanism being disposed on opposite sides of a film aperture, wherein the improvement comprises a film chamber member defining a film chamber having an opening the shape and the dimensions of which are selected so that the cassette can only be inserted therein in a predetermined orientation by movement in its axial direction, thereby holding the inserted cassette in place, and a guide member for guiding the uncut leaked into the camera body when the cassette is inserted into the film chamber, said film chamber member being mounted so that said opening thereof is exposed to premit insertion of the cassette when the camera body is open; said film chamber being a substantially cylindrical chamber with a slot extending tangentially from the peripheral wall thereof, the upper end of the cylindrical chamber defining said opening, the diameter of the cylindrical chamber being slightly larger than that of the cylindrical body portion of the cassette but smaller than the diameter of the cassette including the tongue portion and the slot being arranged so that the tongue portion of the cassette can be only inserted thereinto when the cassette is in said predetermined orientation, whereby insertion of the cassette in orientations other than said predetermined orientation is prevented; said backlid member being hinged to the camera body at its lower edge along an axis extending in the direction of film travel to be swung open and closed.

2. A camera as defined in claim 1, wherein said guide member comprises a member extending from said film chamber member to define a film guiding slit between the inner surface of the backlid member and itself which extends in alignment with said slot of the film chamber member and beyond the film aperture.

3. A camera as defined in claim 2 wherein said member extending from said film chamber has a longitudinally extending inclined surface inclined downward toward the backlid member.

4. A camera as defined in claim 2 wherein said member extending from said film chamber is a round rod.

5. A camera as defined in claim 2 wherein said film guiding slit extends to reach said film take-up mechanism.

6. A camera as defined in claim 1 wherein said film chamber member includes an edge portion which defines one of the inner edges of said slot and is opposed to a recess behind the tongue portion of the cassette when the cassette is inserted into said film chamber; and wherein a tapered projection is provided in the vicinity of said edge portion for engaging the uncut leader of the film.

7. A camera as defined in claim 1 wherein said backlid member supports a film pressure plate so that the film pressure plate is inclined with respect to the focal plane of the camera body when the backlid member is opened and is supported in parallel to the focal plane when the backlid member is closed.

8. A camera as defined in claim 1 wherein said film chamber member is swingable mounted on the backlid member, whereby the backlid member can be further swung with respect to the film chamber member when opened.

9. A camera as defined in claim 1 wherein said film aperture is defined by a frame member comprising a fixed portion and a movable portion, the movable portion defining the edge of the film aperture remote from said film chamber member and being spring urged toward its normal position in which the movable portion defines the film aperture together with the fixed portion, whereby the movable portion is moved away from the normal position when pushed by the tip of said leader to permit the tip to be advanced thereover and is returned to the normal position by the force of the spring after the tip is passed thereover.

10. In a photographic camera adapted to be loaded with a film cassette having a cylindrical body portion and a tongue portion extending from the periphery thereof in a generally tangential direction, a leader of the film contained in said cassette body projecting through an exit slit formed in the tongue portion, the camera including a means for receiving the film cassette and a film take up mechanism for winding up the film from the cassette body, the improvement comprising a film chamber having an opening the shape and dimensions of which are selected so that the cassette can only be inserted thereinto in a predetermined orientation by movement in the axial direction thereof, said film chamber being mounted for rotation about an axis extending in the direction of film travel.

11. In a photographic camera adapted to be loaded with a film cassette having a cylindrical body portion and a tongue portion extending from the periphery thereof in a generally tangential direction, a leader of the film contained in said cassette body projecting through an exit slit formed in the tongue portion, the camera including a means for receiving the film cassette and a film take up mechanism for winding up the film from the cassette body, the improvement comprising guide means for guiding the uncut film leader into the camera body when the cassette is inserted into the cassette receiving means, said guide means including means for uncoiling said film leader including means for engaging an inner surface of said leader at a location proximate said exit slit of said cassette, said guide means being mounted on said camera for pivotal movement about an axis extending in the direction of film travel.

12. In a photographic camera adapted to be loaded with a film cassette having a cylindrical body portion and a tongue portion extending from the periphery thereof in a generally tangential direction, a leader of the film contained in said cassette body projecting through an exit slit formed in the tongue portion, the camera including a means for receiving the film cassette and a film take up mechanism for winding up the film from the cassette body, the improvement comprising guide means for guiding the uncut leader into the camera body when the cassette is inserted into the cassette receiving means, said guide means including means for uncoiling said film leader including means for engaging an inner surface of said uncut leader at a location proximate said exit slit of said cassette, said cassette receiving means comprising a film chamber having a shape and dimensions such that a cassette may be introduced thereinto in only a predetermined orientation, and being mounted on said camera for pivotal movement about an axis extending in the direction of film movement.

* * * * *